Oct. 11, 1932.　　　　H. S. PARDEE　　　　1,881,909
CONTROL SYSTEM
Filed April 2, 1931
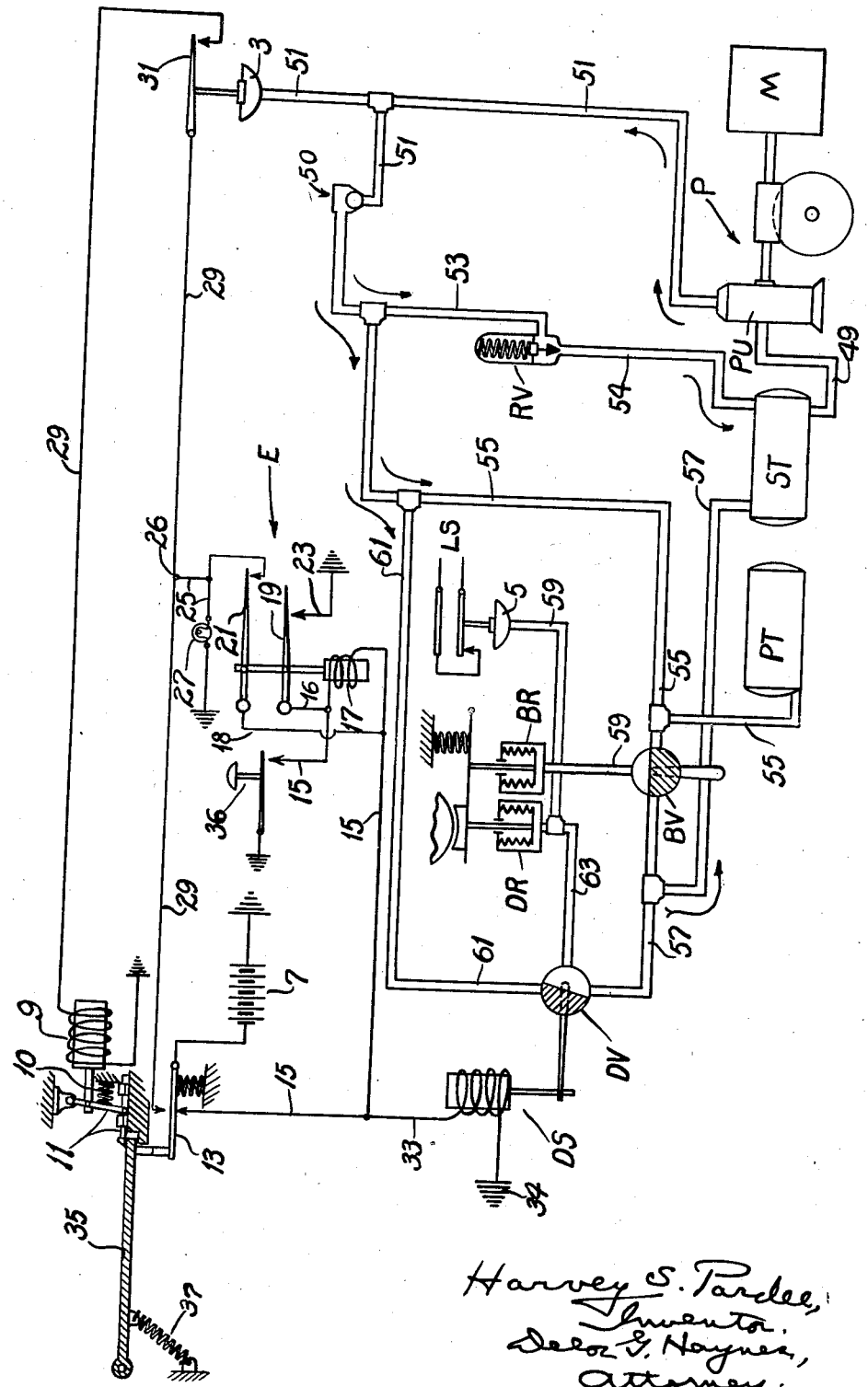
Harvey S. Pardee,
Inventor
Deloz G. Haynes,
Attorney.

Patented Oct. 11, 1932

1,881,909

UNITED STATES PATENT OFFICE

HARVEY S. PARDEE, OF RAVINIA, ILLINOIS, ASSIGNOR TO JOHN ROBERT BLACKHALL, OF HIGHWOOD, ILLINOIS

CONTROL SYSTEM

Application filed April 2, 1931. Serial No. 527,315.

This invention relates to control systems, and with regard to certain more specific features, to a door locking control system.

Among the several objects of the invention, may be noted the provision of a system for controlling a door lock independently of manual control; the provision of a control system of the class described which operatively interconnects the motion of a vehicle with the locking and unlocking of a door on said vehicle; and, the provision of a control system of the class described installed on a vehicle wherein a passenger and the motion of the vehicle cooperate to control the locking and unlocking of a door of said vehicle. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible embodiments of the invention, The single figure is a diagrammatic circuit showing the invention as it may be applied to a street car or the like.

Similar reference characters indicate corresponding parts throughout the figure of the drawing.

The pressure system P as shown in the figure is intended primarily for vehicles and is similar to the pressure system described in my United States Reissue Patent 18,033, issued April 7, 1931. It may, however, comprise any other suitable system. The electrical circuit E is a control system for controlling the lock of a manually operable door of the vehicle. The use of a manually operable door is contrary to the general practice, inasmuch as the doors of most vehicles are usually operated by some form of power device. However, one of the principal objects of the operation of the exit and entrance doors of street cars, by some form of power device, is to prevent unauthorized opening of the doors, or to prevent operation except at regular stops. The secondary object is to save time. The saving of physical exertion on the part of a passenger is not the controlling factor.

Although time may be saved by the use of a door engine, on the entrance door, the use of an engine on exit doors, especially in one-man cars, tends towards loss of time. Thus, if the locking of a manually operable exit door of a vehicle is interlocked with the motion of the car, whereby the door cannot be opened except when the car is at rest, a door control is provided without the expense, bulk, and other complications of maintaining of the usual form of power devices for operating the doors. My invention provides such a door control system, namely, a manually operable door, which is locked and unlocked with the motion of the car, coupled with a signal by a passenger or attendant.

Referring now more particularly to the drawing, the index P shows a hydraulic pressure system adapted to supply energy for operating brake or door engines or the like. A sump tank ST is connected to a pressure tank PT by a line 49, a pump PU, and by lines 51 and 55. The tanks PT and ST may be of any type, the tank PT being adapted to withstand a pressure of the order of six atmospheres. A brake valve BV in the line 55 controls fluid pressure to a braking engine BR or the like, and also allows the braking engine BR to exhaust through line 57 to the sump tank ST. The brake valve BV may be manually operated or operated from a remote control by means of an electromagnet or the like. The braking engine BR may be a bellows type as shown, or a piston or cylinder type. The pump PU is driven by the prime mover M of the vehicle and only operates when the vehicle is in motion.

Shunted across the pump PU is a release valve RV connected to the pressure line 55 through the line 53 and to the sump tank ST by the line 54. The release valve is a spring governed valve and is adapted to shunt the flow of fluid from the pump PU into the sump tank when the pressure in line 55 and in the pressure tank PT goes above a predetermined maximum, that is, when the pump PU is running.

A check valve 50 is placed in the line 51, as shown in the figure and is adapted to keep the fluid pressure in the tank PT from escaping to the line 51 and the pump PU when said pump is not running.

At DV there is shown a dead-man valve connected to the pressure line 55 by the line 61, and to a dead-man braking engine DR by the line 63, and to the sump tank ST through the line 57. The valve DV is a three-way valve and is operable by a dead-man solenoid DS to be described, and is normally in the position shown in the figure, while the car or vehicle is in motion and while the doors of the vehicle are closed.

Connected in the line 51 is a diaphragm 3 operable by the pressure in the line 51.

Another diaphragm 5 connected in the brake line 63 is operable by the fluid pressure in the brake line 63 and is adapted to make and break the connection in the line supply LS of the vehicle. The line supply may be for instance, electrical power supplied to a street car, or the ignition supply on a motorbus.

It is to be understood that the pressure system P is described only for the sake of clarifying the operation of the electrical system shown at index E, and hence the system in part or as a whole is in no way limited thereto.

Referring now more particularly to the door locking control system (index E) there is shown at numeral 7 a battery (and which may comprise a transformer) for supplying energy to a solenoid or locking means 9 adapted to operate a lock 11 which locks and unlocks a vehicle door 35. A make and break contact switch 13, operated by the door 35, alternates the connection of the battery 7 between the lines 15 and 29. The line 29 contains a switch 31 operated by the diaphragm 3 hereinbefore described and is normally open when the pump PU is pumping.

Line 15 connects with a relay which connects with line 29 at a terminal 26. The relay comprises a solenoid 17 operated by current supplied to the line 15, and a grounded push-button 36. The solenoid 17 operates two switches 19 and 21 respectively. Switch 19 is grounded and hence grounds the line 15 through the line 16, the switch 19 and the line 23. The switch 21 connects the line 15, through line 18, the switch 21 and the line 25, to a signal light 27 which is also grounded. The signal light 27 is also connected to the line 29 by way of line 25.

A line 33 connected with the line 15 and grounded at 34 operates the dead-man solenoid DS operating the valve DV.

The operation of the two systems E and P may be described as follows:

Assuming the car or vehicle to be in motion, the door 35 is closed, and the switch 13 is establishing contact between the battery 7 and the line 15, as shown in the figure. Inasmuch as the line 15 is receiving energy from the battery 7 the solenoid DS likewise is receiving energy through the line 33, and the valve DV is in its closed or running position that is, connecting the braking engine DR to the exhaust line 57.

While the car is in motion the pump PU pumps liquid from the tank ST through lines 51 and 55 to the pressure tank PT because the pump is driven from driving parts of the vehicle. The pressure in the line 51 is sufficient to keep the diaphragm 3 in its uppermost position thereby keeping the switch 31 open.

The solenoid 9, in its de-energized position operates the lock 11 to lock the door 35 in a closed position. During this time the switches 19 and 21 are also in an open position.

A passenger in the vehicle wishing to get off at a next stop, pushes the push button 36 thereby making contact between the battery 7, the line 15, the push button 36, to the ground. The current flowing in the line 15 operates the solenoid 17 to close the switch 19, thereby causing current to flow from the battery 7 through the lines 15 and 16 through the switch 19 to the line 23 and to the ground. Thus when the push button 36 is released current still flows through the solenoid 17 by way of the closed switch 19, the self-locking solenoids 17 keeping the switch 19 closed. This action of the solenoid 17 also keeps the switch 21 in a closed position thereby keeping the signal light 27 lit. It is to be understood that the signal light 27 is placed in view of the operator of the vehicle, and calls to his attention the fact that a passenger wishes to alight and he accordingly brings the vehicle to rest at the proper stop, by means of the valve BV controlling the brake cylinder BR. As the car stops the pressure in line 51 drops to zero, because the pump PU driven by the motion of the vehicle, also stops, and the check valve 50 holds back the pressure from PT, thereby allowing the pressure in the line 51 to drop due to leak over in the pump. The switch 31 then closes. The closing of the switch 31 immediately allows the solenoid 9 to receive energy from the battery 7 through the line 15, line 18, switch 21, the lines 25 and 29, the switch 31, and the line 29. The solenoid 9 thus operates to unlock the door 35. As soon as the car has stopped the passenger pushes the door 35 open and alights from the vehicle. But, the opening of the door changes the contact of the switch 13 to disconnecting the battery 7 from the line 15. By this action the contact between the battery and the relay is broken and the solenoid 17 immediately drops back to its de-energized position. This same action operates the dead-man solenoid DS which being de-energized drops, thereby admitting pressure from the line 61 to the engine DR and preventing further motion of the car. The pressure admitted to the line 63 also operates the diaphragm 5, thereby cutting off the line supply to the motor M.

Thus as a passenger alights from the vehicle through the door 35 which is in an open position, the brakes of the vehicle are positively set independently of any action of the motorman so that in no way can the passenger be injured by motion of the car as he alights. While the passenger is alighting from the vehicle the signal lamp 27 continues to burn receiving its energy through the back contact of switch 13, lines 29 and 25. When the passenger frees the door 35 after having alighted, it closes by the action of a spring 37 or the like, thereby breaking the back contact of the switch 13 and the line 29 and making contact with the switch 13 and the line 15.

This breaks contact with the battery 7 and the light 27, extinguishing the same, and energizes the solenoid DS thereby returning the valve DV to the position shown in the figure and exhausting the brake engine DR to the sump tank ST. The operator realizes that he can now start the vehicle because the signal light 27 is extinguished. The motion of the vehicle starts the pump PU thereby establishing a pressure in the line 51 which opens the switch 31, positively cutting off the door-unlocking solenoid 9 from the battery 7.

To recapitulate, the closing of the door 35 breaks the contact between the battery 7 and the line 29 thereby de-energizing the solenoid 9 which allows the lock 11 to secure the door 35 in a closed position. Making the connection between the line 15 and the battery 7 by the switch 13 operates the solenoid DS to set the dead-man valve DR to release. The battery 7 cannot now feed through the line 15 to the line 29 inasmuch as the relay with its switch 21 was opened by the opening of the door 35.

An advantage of this door control system which is interlocked with the motion of the vehicle is that the control of the door of the vehicle is independent of the motorman, who has nothing to do with it except to bring the car to a stop after the signal light is lit. Although the system described is adapted to use on an exit door, it may easily be modified to be used on entrance doors.

Another advantage of the invention as shown is the time saved by the operation of the exit doors by the passenger. The operator is not required to look around, to see when the passenger is free from the car.

This system is also adaptable to cars having a conductor, guard or other attendant one of whose duties may be to operate a signal button such as 36, if desired. Also the button 36 may be installed at various points throughout the car as one at every seat.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A vehicle control system comprising a door adapted to be manually opened, a lock therefor, means operable to maintain said lock in locking position while the vehicle is in motion and to effect unlocking only when said vehicle is substantially at rest, and manually operable control means adapted to be set while the vehicle is in motion to effect unlocking of said lock at a subsequent stop.

2. A vehicle control system comprising a door adapted to be manually opened, a lock therefor, means operable to maintain said lock in locking position while the vehicle is in motion and to effect unlocking only when said vehicle is substantially at rest, manually operable control means adapted to be set while the vehicle is in motion to effect unlocking of said lock at a subsequent stop and signal means operable by said control means adapted to indicate the condition of said control means.

3. A vehicle control system comprising a door adapted to be manually opened, a lock therefor, means operable to maintain said lock in locking position while the vehicle is in motion and to effect unlocking only is in motion and to effect unlocking only when said vehicle is substantially at rest, manually operable control means adapted to be set while the vehicle is in motion to effect unlocking of said lock at a subsequent stop, at least one brake for the vehicle, and means for holding said brake to braking position when the vehicle is at rest and the door is open, regardless of the action of an operator of the vehicle brakes.

4. A vehicle control system comprising a door adapted to be manually opened, a lock therefor, means operable to maintain said lock in locking position while the vehicle is in motion and to effect unlocking only when said vehicle is substantially at rest, manually operable control means adapted to be set while the vehicle is in motion to effect unlocking of said lock at a subsequent stop, at least one brake for the vehicle and deadman means adapted to ensure brake setting when said door is open.

5. A vehicle control system comprising a door adapted to be manually opened, a lock therefor, means operable to maintain said lock in locking position while the vehicle is in motion and to effect unlocking only when said vehicle is substantially at rest, manually operable control means adapted to be set while the vehicle is in motion to effect unlocking of said lock at a subsequent stop, at least one brake for the vehicle and deadman means adapted to ensure brake setting when said door is open but preventing brake setting by the manipulator of said manual control means.

6. A vehicle control system comprising a door adapted to be manually opened, a lock therefor, means operable to maintain said lock in locking position while the vehicle is in motion and to effect unlocking only when said vehicle is substantially at rest, manually operable control means adapted to be set while the vehicle is in motion to effect unlocking of said lock at a subsequent stop, at least one brake for the vehicle and dead-man means operable to set the brake when said door is unlocked and open.

7. A vehicle control system comprising a door adapted to be manually opened, a lock therefor, means operable to maintain said lock in locking position while the vehicle is in motion and to effect unlocking only when said vehicle is substantially at rest, manually operable control means adapted to be set while the vehicle is in motion to effect unlocking of said lock at a subsequent stop, at least one brake for the vehicle and dead-man means operable to set the brake when said door is unlocked and open and means operable by the dead-man control adapted to cut off vehicle motivating power.

8. In a door locking control system for a vehicle, means for controlling the locking and unlocking of said door, said means being inoperable to unlock said door when said vehicle is in motion, but being manually operable to unlock said door when said vehicle is substantially not in motion, and being adapted to lock said door by the closing of said door.

9. In combination with a vehicle having a door, a door locking control system for said door comprising a means for controlling the unlocking of said door, and manually operable means in said system adapted to set said controlling means to unlock said door when said vehicle stops.

10. In combination with a vehicle having a door, a door locking means, means adapted to effect by the motion of said vehicle the operation of said door locking means, a manually operable means adapted to energize said locking means when said car substantially stops, whereby said door is unlocked, and a means in said system operable by the opening and closing of said door adapted to energize said locking means while said door is open and to de-energize said locking means when said door closes, said means operable by said door also being adapted to shut off the source of power to said vehicle while said door is open.

11. In a door locking control system for a vehicle, door locking means, means adapted to control the unlocking of said door locking means, and means in said system adapted to effect by the motion of said vehicle the operation of said controlling means, and means in said system, operable by the opening and closing of said door adapted to set the brakes of said vehicle while said door is in an opened position and to control the locking of said locking means when said door closes.

12. In a door locking control system for a vehicle, door locking means, means adapted to control the unlocking of said door locking means, and means adapted to effect by motion of said vehicle the operation of said controlling means, and means in said system operable by the opening and closing of said door adapted to set the brakes of said vehicle when said door is in an opened position, and to control the locking of said locking means when said door is closed, said means also being adapted to shut off the source of power to said vehicle when said door is in an opened position.

13. In a locking system, a door, a locking means, a relay adapted to energize said locking means when said door is closed, and a switch adapted to energize said locking means and to de-energize said relay when said door is open, and to de-energize said locking means when said door closes.

14. In a locking system, a door, a locking means, a relay adapted to energize said locking means when said door is closed, a switch adapted to energize said locking means and to de-energize said relay when said door is open, and to de-energize said locking means when said door closes, and a signal means in said system adapted to indicate the position of said relay and said door.

15. In a door locking control system, a door, a source of energy, a door locking means operable by said source of energy, a relay, and means operable by said door adapted to connect said source and locking means through said relay when said door is closed and directly when said door is open, a manually operable means in said system, said means being adapted to close said relay, the opening of said relay being controlled by the opening of said door, and a signal means in said system for indicating a closed position of said relay or an opened position of the door.

16. In combination with a vehicle having a door, a door locking means, means in said system adapted to effect by the motion of said vehicle the operation of said locking means, a manually operable means adapted to control the unlocking of said locking means when said car stops, and a means in said system operable by the opening and closing of said door adapted to control the locking of said locking means when said door recloses.

17. In combination with a vehicle having a door, a door locking means operable from a source of energy, means interposed between said source and locking means adapted to effect by the motion of said vehicle the operation of said locking means, a manually operable means interposed between said source and locking means, said means being adapted to connect said source of energy and said locking means when said car stops, and a means operable by the opening and closing of said door adapted to connect said source of energy and said locking means while said door is opened and to disconnect said source and locking means when said door closes, said door operated means being adapted to set the brakes of said vehicle when said door is in an opened position.

18. In combination with a vehicle having a door, a door locking means operable from a source of energy, means interposed between said source and locking means adapted to effect by the motion of said vehicle the operation of said locking means, a manually operable means interposed between said source and locking means, said means being adapted to connect said source of energy and said locking means when said car stops, and a means operable by the opening and closing of said door adapted to connect said source of energy and said locking means while said door is opened and to disconnect said source and locking means when said door closes, said door operated means being adapted to set the brakes of said vehicle when said door is in an opened position, and a signal means adapted to indicate the position of said manually operated means, and the position of said door.

19. In combination with a vehicle, a door and a door locking control system comprising a door locking means, the operation of said locking means being effected by the motion of said vehicle, a switch operable by said door, and a manually operable relay in said system, said relay when closed being adapted to energize said locking means when said vehicle stops, and said switch being adapted to open said relay when said door is opened.

20. In combination with a vehicle, a door, a door locking means, the operation of said locking means being interconnected with the motion of said vehicle, a manually operated means adapted to move said locking means to unlocking position when said vehicle stops, and a door operated means adapted to hold said locking means in said unlocking position while said door is in an opened position.

21. In combination with a vehicle, a door, and a door locking control system comprising a door locking means, the operation of said locking means being interconnected with the motion of said vehicle, a manually operated means adapted to move said locking means to unlocking position when said vehicle stops, a door operated means adapted to hold said locking means in said unlocking position while said door is in an opened position, and a signal means in said system for indicating the position of said manually operated means and said door.

22. In combination with a vehicle, a door, a door locking control system comprising a door locking means, the operation of said locking means being effected by the motion of said vehicle, a manually operated means adapted to move said locking means to unlocking position when said vehicle stops, and a door operated means adapted to hold said locking means in said unlocking position when said door is opened, said door operated means also being adapted to positively effect braking of said vehicle when said door is in an opened position.

In testimony whereof, I have signed my name to this specification this 31st day of March, 1931.

HARVEY S. PARDEE.